(No Model.)
P. I. UNWIN & H. HOWARD.
ARC WELDING AND HEATING APPARATUS.
No. 480,794. Patented Aug. 16, 1892.
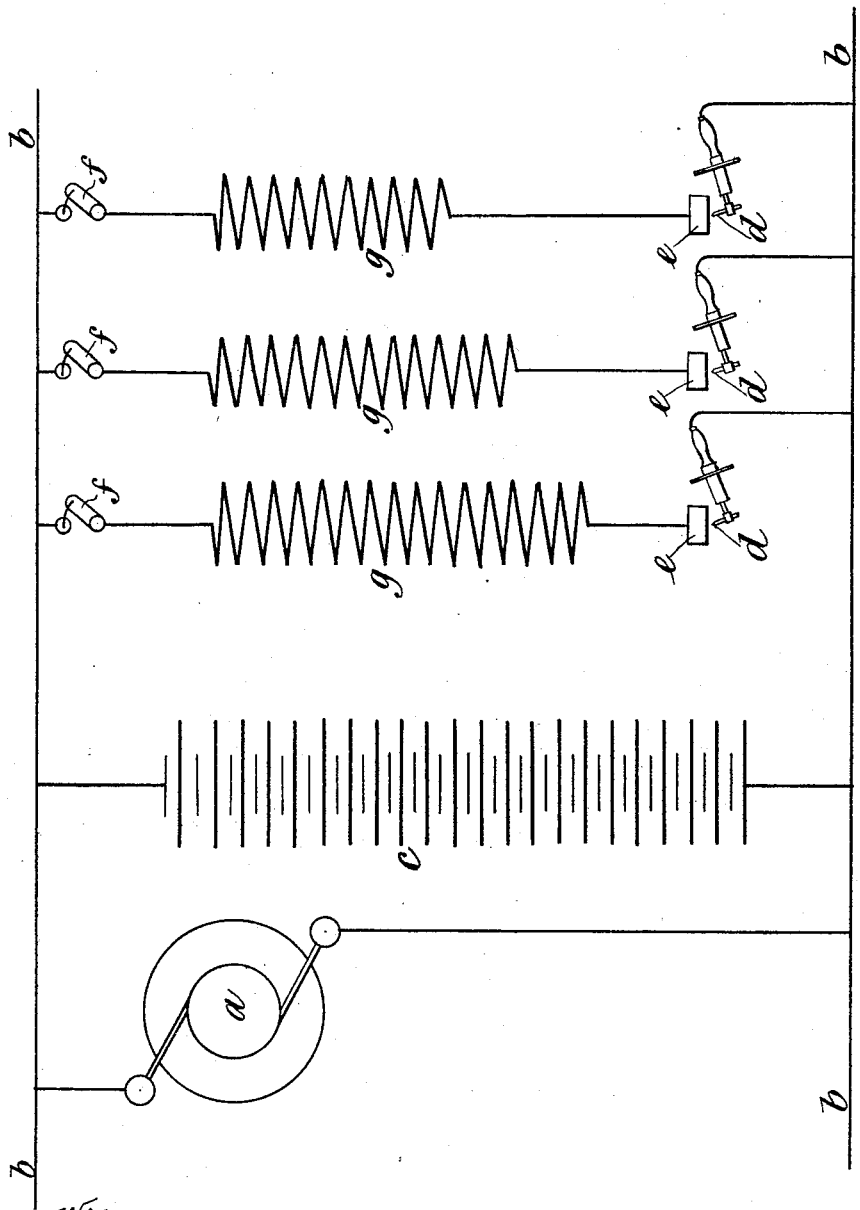
Witnesses.
Baltus D? Long.
Edward Rouser.
Inventors
Philip Ibotson Unwin,
Henry Howard,
By their attys.
Baldwin Davidson Wight.

UNITED STATES PATENT OFFICE.

PHILIP IBOTSON UNWIN AND HENRY HOWARD, OF HALESOWEN, NEAR BIRMINGHAM, ENGLAND, ASSIGNORS TO LLOYD & LLOYD, OF SAME PLACE.

ARC WELDING AND HEATING APPARATUS.

SPECIFICATION forming part of Letters Patent No. 480,794, dated August 16, 1892.

Application filed June 14, 1892. Serial No. 436,670. (No model.)

*To all whom it may concern:*

Be it known that we, PHILIP IBOTSON UNWIN and HENRY HOWARD, subjects of the Queen of Great Britain, residing at Coomb's Wood Tube Works, Halesowen, near Birmingham, England, have invented certain new and useful Improvements in Heating and Welding by the Electric Arc, of which the following is a specification.

This invention relates to improvements in heating and welding by the electric arc, and is applicable to that system in which an electric arc is formed between a carbon or other pencil and the portion of the work which is required to be heated.

It has for its object the economy of power when a number of circuits are being employed intermittently, so that either all, a few, or none may be in use.

We arrange the working plant as shown in the diagram. An ordinary low-tension continuous-current dynamo $a$ is provided, such as is employed in electric lighting. This dynamo is preferably run continuously at an approximately-constant speed during working hours. Connected with the terminals of the dynamo are two electric mains $b\ b$. Between these mains and in parallel with the dynamo is a battery $c$ of accumulators suitable to receive the current from the dynamo when it is not required for heating and welding.

The accumulator we prefer to employ is that forming the subject of the Patent No. 380,544, which we find stands the severe work extremely well, while the rate at which the discharge sometimes takes place is ruinous to most other accumulators; also, in parallel with the dynamo and the accumulators are two or more electric heaters or welders, each comprising circuit connections, through which a pencil $d$ is connected with one electric main $b$ and the work $e$ or the support on which the work rests with the other electric main $b$, a key or circuit-closer $f$, by which the circuit can be closed and opened at pleasure, and an adjustable resistance $g$, by means of which the workman may thereby regulate the current and pressure to the requirements of his work. The pencil may be connected either to the positive or to the negative main, according to the nature of the work to be performed. Thus for welding iron or steel the carbon pencil is connected to the negative main, while for welding lead or for dripping metal onto the work from a metallic pencil the connection is with the positive main. The resistance may be placed either between the work and the main or between the pencil and the main. The resistance need not be adjustable if the circuit will always be required for the same work. The circuit-closer $f$ may also be omitted, as the removal of the pencil from the neighborhood of the work breaks the circuit.

The cells of the accumulator are arranged in sets or batteries connected in parallel, the cells of each set or battery being in series, so as to be capable of giving a potential equal to that of the dynamo. The total number of cells should be such that the accumulator will store all the current produced by the dynamo and not immediately required for the welding-circuits. Usually it will be found convenient for the discharges from the accumulator and the dynamo to be about equal. Thus if a current of five hundred ampères and fifty volts be produced by the dynamo, the accumulator should consist of about eighty sets of cells arranged in parallel, each set containing twenty-one cells in series, the plates in the cells having each an area of forty square inches. It will be understood that these figures are only given by way of illustration. The quantity and potential of the current can be varied.

The plant may be readily increased by placing more dynamos, more welders, or more batteries in parallel with the others, the whole system being worked at an approximately-constant potential.

What we claim is—

1. In heating and welding by the electric arc, the combination of a continuous-current dynamo, mains connected to the two poles of the dynamo, an accumulator or secondary battery having its poles connected to the mains in parallel with the dynamo, two or more conductors, each having one end connected to one main and the other end to a pencil, two or more conductors, each having one end connected to the other main and the other end to the work or the support of the work, and two or more resistances, each interposed between one of the mains and the pencil or work.

2. In heating and welding by the electric arc, the combination of a continuous-current dynamo, mains connected to the two poles of the dynamo, an accumulator or secondary battery having its poles connected to the mains in parallel with the dynamo, two or more conductors, each having one end connected to one main and the other end to a pencil, two or more conductors, each having one end connected to the other main and the other end to the work or the support of the work, and two or more resistances differing in resistance from each other and interposed between one of the mains and the pencil or work.

PHILIP IBOTSON UNWIN.
    HENRY HOWARD.

Witnesses:
 C. A. LLOYD,
  *Cannon Hill, Birmingham.*
 ARTHUR G. HOOPER,
  *Sol. and Not. Pub., Dudley.*